(12) United States Patent
Miyawaki

(10) Patent No.: US 7,524,073 B2
(45) Date of Patent: Apr. 28, 2009

(54) LAYERED PERIODIC STRUCTURES WITH PERIPHERAL SUPPORTS

(75) Inventor: Mamoru Miyawaki, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 119 days.

(21) Appl. No.: 11/560,617

(22) Filed: Nov. 16, 2006

(65) Prior Publication Data

US 2008/0117508 A1     May 22, 2008

(51) Int. Cl.
F21V 5/02 (2006.01)
F21V 9/14 (2006.01)
G02B 5/18 (2006.01)

(52) U.S. Cl. .................. 362/19; 362/339; 359/486; 359/576

(58) Field of Classification Search ........ 362/331, 362/339, 19; 359/486, 495, 497, 566, 569, 359/571, 572, 576; 349/96
See application file for complete search history.

(56) References Cited

U.S. PATENT DOCUMENTS

| | | | | |
|---|---|---|---|---|
| 5,905,571 A * | 5/1999 | Butler et al. | .......... | 356/328 |
| 7,155,073 B2 | 12/2006 | Momoki et al. | | |
| 2002/0105725 A1* | 8/2002 | Sweatt et al. | .......... | 359/566 |
| 2003/0117708 A1* | 6/2003 | Kane | .......... | 359/513 |
| 2003/0231373 A1* | 12/2003 | Kowarz et al. | .......... | 359/291 |
| 2004/0239869 A1* | 12/2004 | Cavanaugh et al. | .......... | 349/198 |
| 2005/0249447 A1 | 11/2005 | Momoki et al. | | |
| 2006/0092513 A1* | 5/2006 | Momoki | .......... | 359/486 |
| 2006/0119917 A1* | 6/2006 | Sutherland et al. | .......... | 359/34 |
| 2007/0019292 A1* | 1/2007 | Kim et al. | .......... | 359/486 |
| 2008/0038852 A1* | 2/2008 | Miyawaki et al. | .......... | 438/21 |

* cited by examiner

Primary Examiner—Stephen F Husar
Assistant Examiner—Peggy A. Neils
(74) Attorney, Agent, or Firm—Fitzpatrick, Cella, Harper & Scinto

(57) ABSTRACT

A grating for an optical device. The grating includes a working area comprising a periodic grating structure and a non-working area comprising a support structure for mating with an additional component of the optical device. The support structure supports the additional component in order to prevent strains from developing in the grating. The strains may come from physical stresses applied to the optical device during manufacturing or use or may come from changes in the temperature of the optical device. The support structure may operate by providing an element whose width to height ratio is greater than a width to height ratio of the elements in the grating structure. The support structure may also operate by being higher than the working area of the grating. Furthermore, the non-working area of the grating may include alignment marks used during the manufacturing of the optical device.

16 Claims, 14 Drawing Sheets

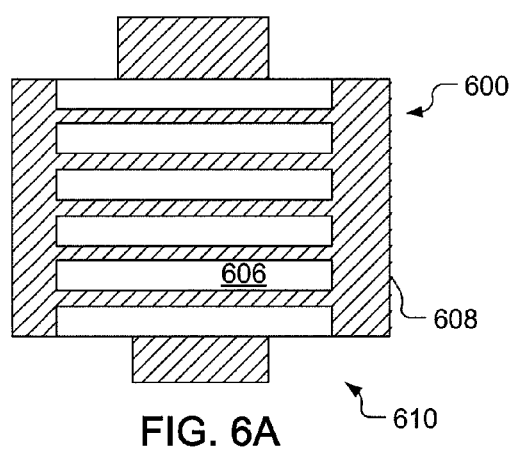
FIG. 6A
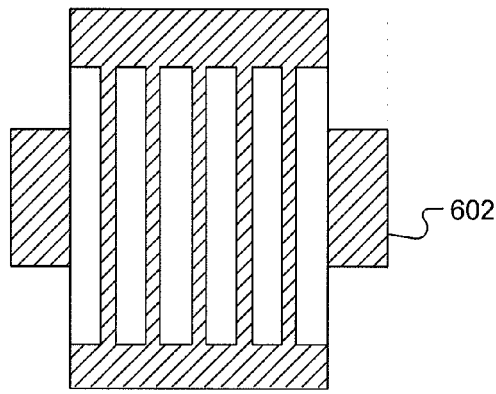
FIG. 6B
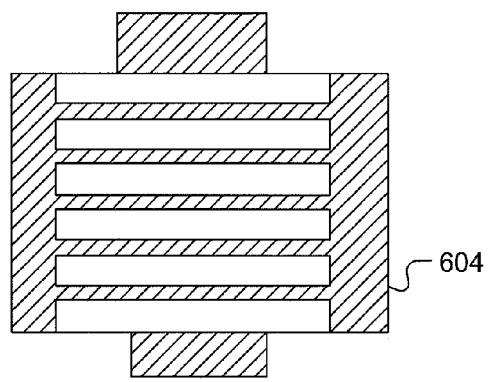
FIG. 6C
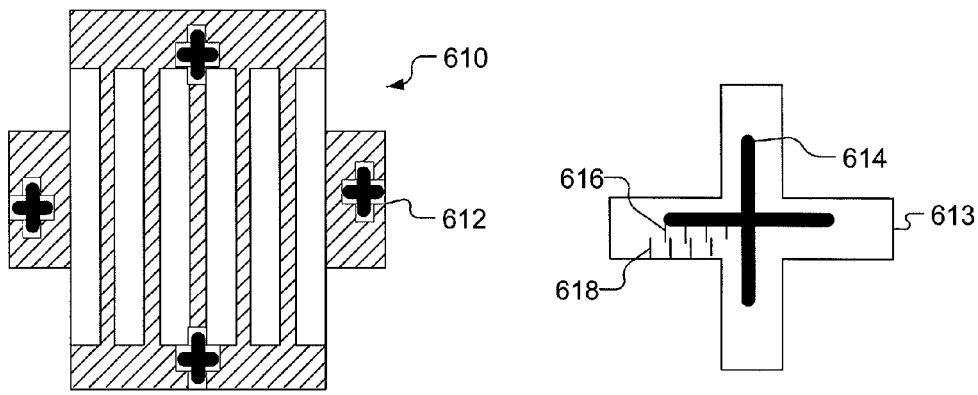
FIG. 6D
FIG. 6E

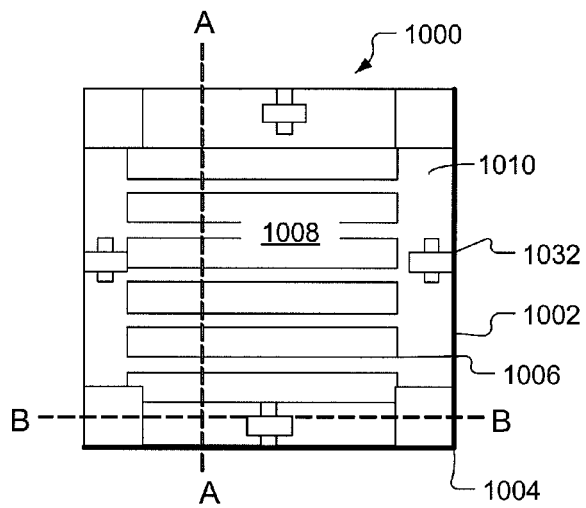
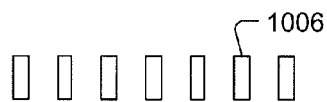
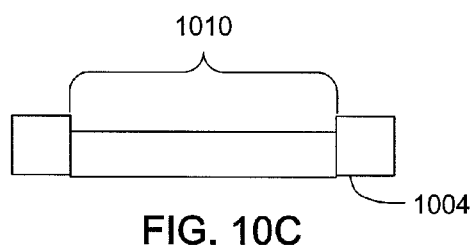
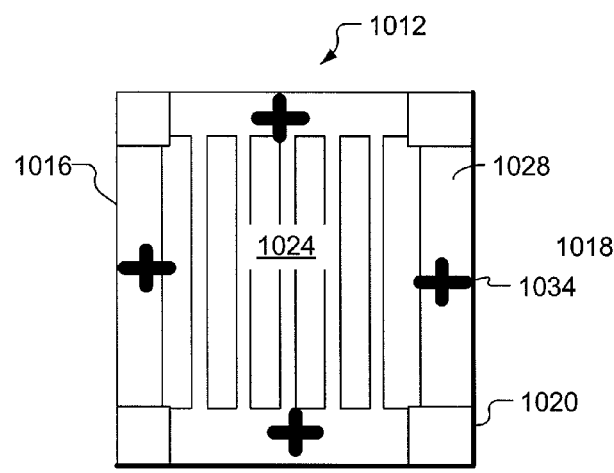
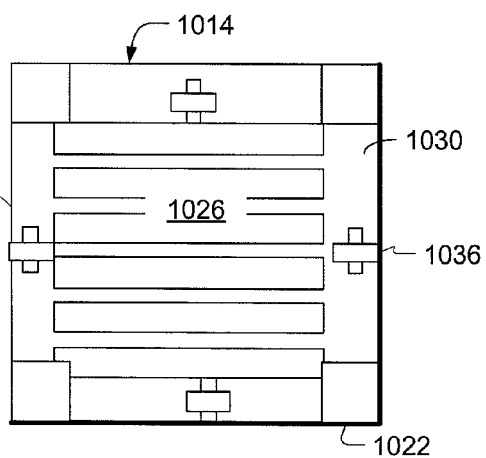
FIG. 10A
FIG. 10B
FIG. 10C
FIG. 10D
FIG. 10E

LAYERED PERIODIC STRUCTURES WITH PERIPHERAL SUPPORTS

BACKGROUND

1. Field of the Invention

The present invention pertains generally to manufacturing devices with nanometer scaled features and more specifically to manufacturing components for a Polarization Beam Splitter (PBS).

2. Description of the Related Art

PBSs have been created having a multilayer polarization splitting elements. The multilayer polarization splitting elements are composed of layers having a high refractive index alternating with layers having a low refractive index. These multilayer polarization splitting elements are constructed using $TiO_2$. Such a PBS is described in U.S. application Ser. No. 11/122,153 entitled "POLARIZATION ELEMENT AND OPTICAL DEVICE USING POLARIZATION ELEMENT" filed May 3, 2005. which issued Dec. 26, 2006 as U.S. Pat. No. 7,155,073.

FIG. 1 is a structural view showing a PBS. FIG. 1 shows a state in which a polarization splitting layer 23 composed of a plurality of periodic structures each having structural birefringence is sandwiched by two prisms. The polarization splitting layer 23 and the two prisms compose an optical element having a polarization splitting function.

In FIG. 1, the polarization splitting layer 23 is tilted at Brewster angle relative to an incident surface 25 of the prism. When an incident light beam including a P-polarized light component 18 and an S-polarized light component 20 is perpendicularly made incident on the incident surface 25, the P-polarized light component 18 passes through the polarization splitting layer 23 to become passing light 19, and the S-polarized light component 20 is reflected on the polarization splitting layer 23 to become reflective light 21. As illustrated herein, the optical element is assumed to be used for visible light.

FIG. 2 is a conceptual view showing the polarization splitting layer 23. The polarization splitting layer 23 has a plurality of grating structures (periodic structures) stacked therein. Periodic directions of adjacent grating structures are substantially orthogonal to each other. In this embodiment, five one-dimensional grating structures corresponding to five layers are stacked. (FIG. 2 is the conceptual view so only three one-dimensional grating structures are shown therein.) Assume that first, second, third, fourth, and fifth one-dimensional gratings are arranged in order from a light incident side (upper side of FIG. 2). A period of each of the grating structures is shorter than a wavelength of any incident light. Each of the grating structures exhibits structural birefringence.

As shown in FIG. 2, an incident surface on which the incident light beam (P-polarized light component 18 and S-polarized light component 20) is made incident is orthogonal to a periodic direction of the first one-dimensional grating. The periodic direction of the first one-dimensional grating is assumed to be a grating direction V. As shown in FIG. 2, a periodic direction of the second one-dimensional grating is orthogonal to the grating direction V and assumed to be a grating direction P.

When the light is made incident on the polarization splitting layer 23, the S-polarized light component is reflected thereon and the reflective light 21 thereof exits from an exit surface 26 different from the incident surface 25 located on the light incident side of the prism. At this time, the P-polarized light component passes through the polarization splitting layer 23 and the passing light 19 thereof exits from an exit surface 27 located on the light exit side of the prism.

This PBS performs well as it has a performance such as wide incident angle as well as broad wavelength. But, it is difficult to make such a device. One difficulty is lies in the stresses that must be applied to the PBS during manufacturing. As the ratio of the height of the grating elements to the width of the grating elements is high, the grating elements may not tolerate lateral stresses induced when the grating structures are stacked or when additional optical elements are bonded to the stack of gratings. In addition, once the PBS is constructed, the PBS may be fragile as shocks experienced by the PBS may be transmitted to the active portions of the stacked gratings which may cause toppling of the grating elements. Finally, as traditional manufacturing processes for the stacked periodic structures leave the periodic structures tightly bound, expansion and contraction of the structures because of temperature changes may cause the shape of the periodic structures to change.

Therefore, a need exists for a manufacturing process that provides for reduced physical and thermal stresses being transmitted to the grating structures in a PBS. Various aspects and embodiments of the present invention meet such a need.

SUMMARY OF THE INVENTION

In one aspect of the invention, a grating for an optical device is provided. The grating includes a working area comprising a periodic grating structure and a non-working area comprising a support structure for mating with an additional component of the optical device.

In one aspect of the invention, a ratio of a width of an element of the support structure to a height of the element of the support structure is greater than a ratio of a width of an element in the periodic grating structure to a height of the element.

In another aspect of the invention, a height of an element of the support structure is greater than a height of an element in the periodic grating structure.

In another aspect of the invention, the additional component is another grating in the optical device.

In another aspect of the invention, the additional component is an optical component of the optical device.

In another aspect of the invention, the non-working area further comprises an alignment mark.

In another aspect of the invention, the non-working area is peripheral to the working area and the non-working area and support structure are contiguous and enclose the working area. The contiguous support structure may further include one or more openings into the enclosed working area.

In another aspect of the invention, the support structure is non-contiguous providing one or more openings in communication with the working area.

In another aspect of the invention, the support structure comprises a plurality of non-contiguous support elements.

In another aspect of the invention, the working area has an effective area within the periodic grating structure and a transitional area within the periodic grating structure between the effective area and the non-working area.

In another aspect of the invention, a layered periodic structure is built using periodic grating structures with each periodic grating structure having effective areas and transitional areas, thus creating effective and transitional areas in the layered periodic structure. When the layered periodic structure is used in an application, light to be polarized is transmitted into the layered periodic structure into an effective area of the working area of the layered periodic structure and without transmitting light through the transitional area.

BRIEF DESCRIPTION OF THE DRAWINGS

The present invention will be more readily understood from a detailed description of the preferred embodiment taken in conjunction with the following figures.

FIGS. 6a, 6b, 6c, and 6d are schematics illustrating a series of periodic grating structures having alignment marks in accordance with an exemplary embodiment of the present invention.

FIG. 6e is a schematic illustrating an alignment mark in accordance with an exemplary embodiment of the present invention.

FIGS. 10a, 10d and 10e are top views of periodic grating structures in accordance with an exemplary embodiment of the present invention.

FIGS. 10b and 10c are cross-sectional views of a periodic grating structure in accordance with an exemplary embodiment of the present invention.

DETAILED DESCRIPTION

Figure 1:
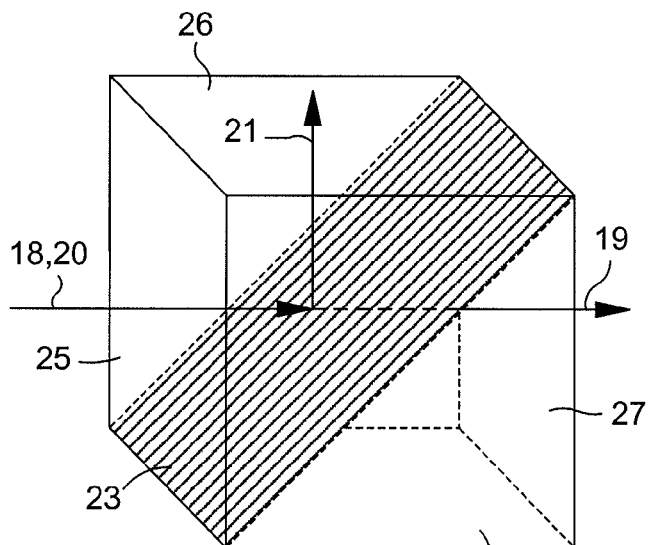
FIG. 1 is a schematic view showing a polarization splitting element.

As previously described, FIG. 1 is a structural view showing a polarization splitting element. FIG. 1 shows a state in which a polarization splitting layer 23 composed of a plurality of periodic structures each having structural birefringence is sandwiched by two prisms. The polarization splitting layer 23 and the two prisms compose an optical element having a polarization splitting function.

Figure 2:
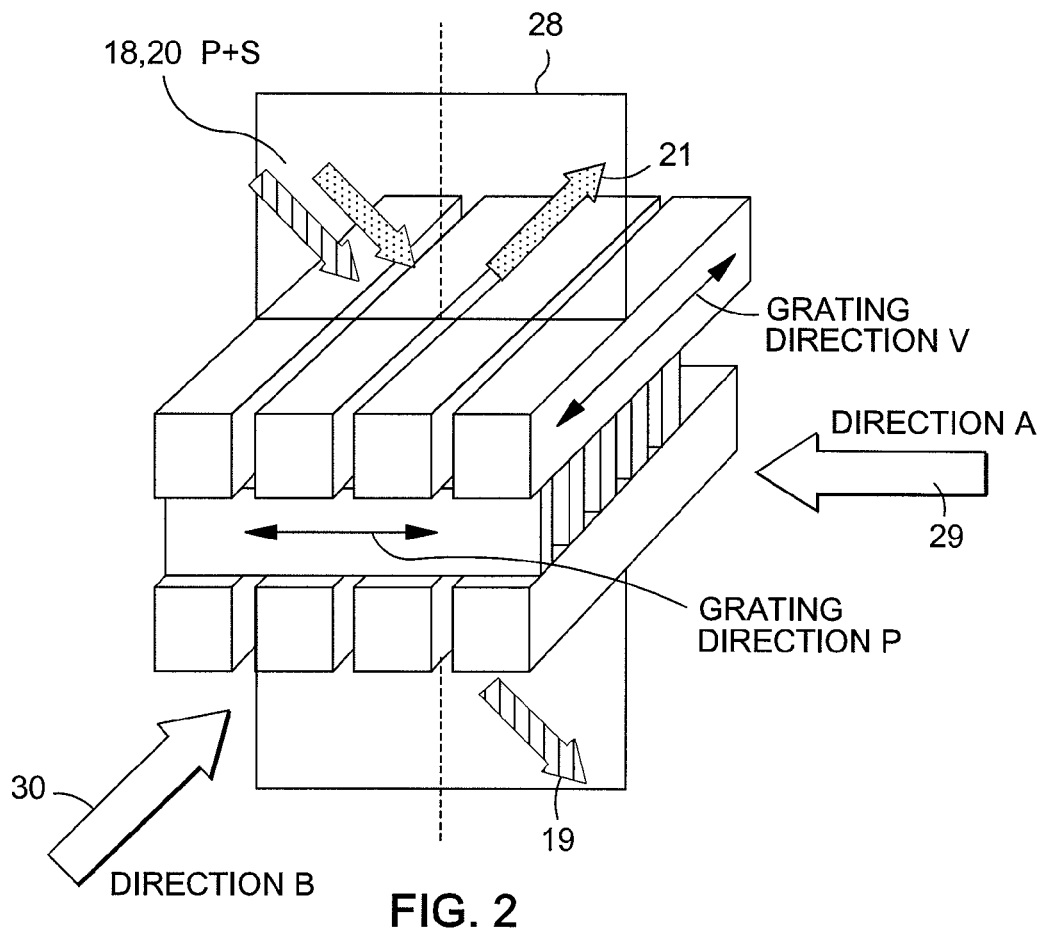
FIG. 2 is a schematic view of a polarization splitting layer.

FIG. 2 is a conceptual view showing the polarization splitting layer 23. The polarization splitting layer 23 has a plurality of grating structures (periodic structures) stacked therein. Periodic directions of adjacent grating structures are substantially orthogonal to each other. In this embodiment, five one-dimensional grating structures corresponding to five layers are stacked. (FIG. 2 is the conceptual view, so only three one-dimensional grating structures are shown therein.) Assume that first, second, third, fourth, and fifth one-dimensional gratings are arranged in order from a light incident side (upper side of FIG. 2). A period of each of the grating structures is shorter than a wavelength of any incident light.

A complete description of the polarization splitting layer 23, the element incorporating the polarization splitting layer and several embodiments is provided in co-pending U.S. application Ser. No. 11/122,153 entitled "POLARIZATION ELEMENT AND OPTICAL DEVICE USING POLARIZATION ELEMENT" filed May 3, 2005, the contents of which are incorporated by reference as if stated in full herein.

While the following description applies specifically to formation of gratings for a polarization splitting layer, such as polarization splitting layer 23, various embodiments of the manufacturing processes disclosed herein are applicable to forming periodic or aperiodic structures for components for other optical and RF applications. For example, a stacked grating structure could be used for filters for specific RF frequencies, detectors, couplers; or for telecommunication applications such as waveguides, lasers, detectors, modulators, multiplexers or demultiplexers. Stacked structures created according to the following descriptions may also be used in optical imaging devices such as a the described PBS, polarizers, diffraction elements for antireflection coatings, and a chromatic aberration correction lens and for use in optical memories such as a DVD or CD, or an optical head.

Furthermore, various methods have been proposed for manufacturing a polarization splitting layer. As an example, U.S. patent application Ser. No. 11/500,321 entitled "METHOD FOR MANUFACTURING LAYERED PERIODIC STRUCTURES" filed Aug. 8, 2006, the contents of which are hereby incorporated by reference, describes several such methods.

Figure 3:
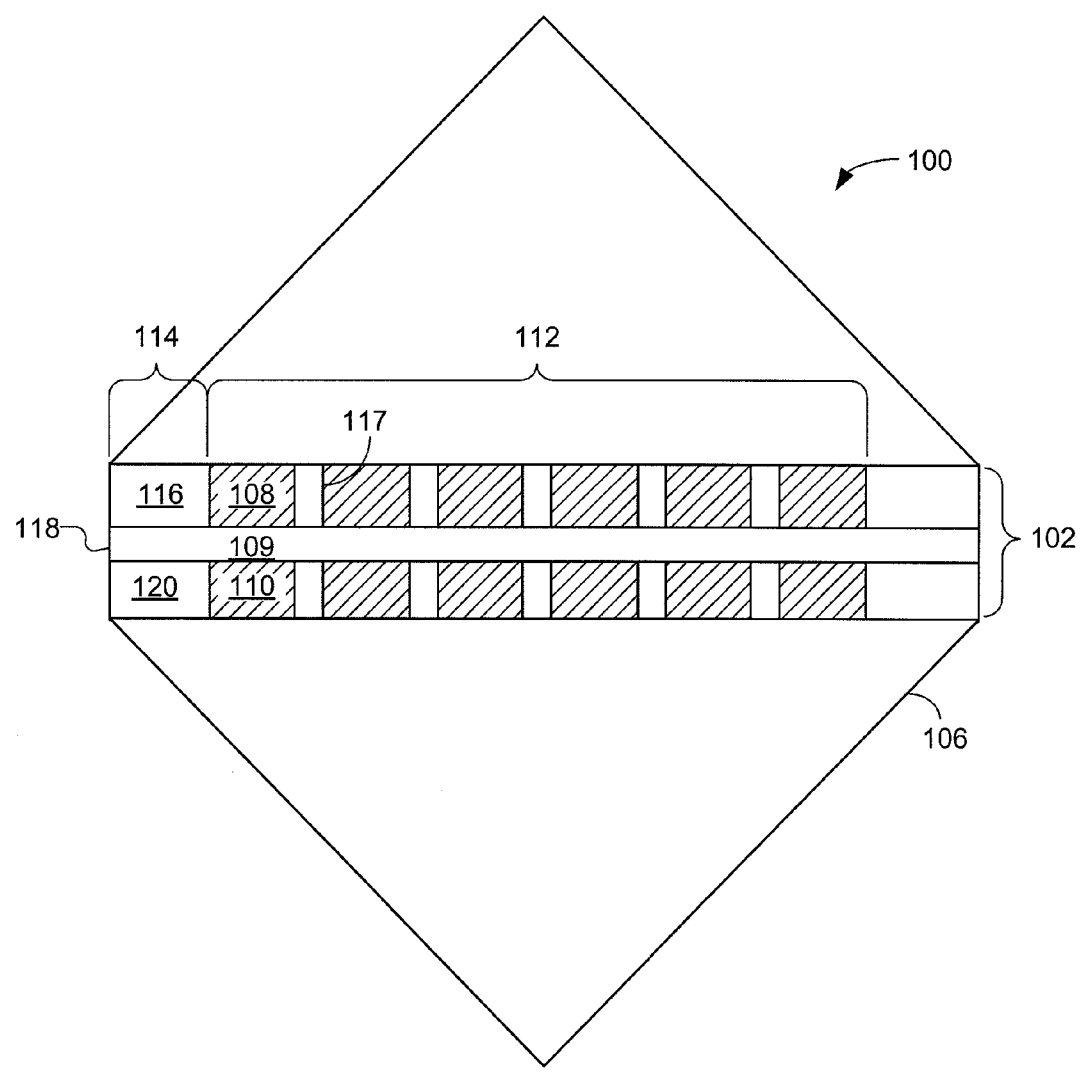
FIG. 3 is a cross-sectional schematic view of a polarization splitting element in accordance with an exemplary embodiment of the present invention.

Having discussed the types of devices FIG. 3 is a cross-sectional schematic view of an optical device, such as a polarization splitting element, in accordance with an exemplary embodiment of the present invention. A polarization splitting element 100 includes a layered periodic structure 102 bonded to a first component, such as prism 104, and a second component, such as prism 106. The layered periodic structure includes a plurality of periodic grating structures, such as periodic grating structures 108, 109 and 110. Each periodic grating structure includes at least one working area, for example working area 112 of periodic grating structure 108, and at least one non-working area, such as non-working area 114 of periodic grating structure 108. The non-working area includes one or more support structures that include elements, such as element 116, that mate with support structure elements, such as elements 118 and 120, in other non-working areas of other layered periodic structures. In this way, the support structure elements take the loads applied to the support elements' respective periodic grating structures without transferring the loads to working elements, such as working element 117, in the working areas of the support elements' respective periodic grating structures. As illustrated, the non-working area is peripheral to the working area; however, the non-working area may be located otherwise than peripheral to the working area, such as adjacent to or surrounded by the working area.

The elements of the support structures have lower aspect ratios, that is, a ratio of a height of the element to a width of the element, than individual elements, such as element 118, within the working areas of the periodic gratings. This allows the support structures in the non-working areas of the periodic gratings to absorb and transfer stresses induced during manufacturing and usage of the optical device without disturbing unduly the elements of the working areas of the periodic gratings.

Figure 4A:
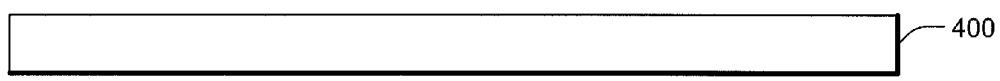
FIGS. 4a to 4k are schematics illustrating a manufacturing process for a layered structure in accordance with an exemplary embodiment of the present invention.
Figure 4B:
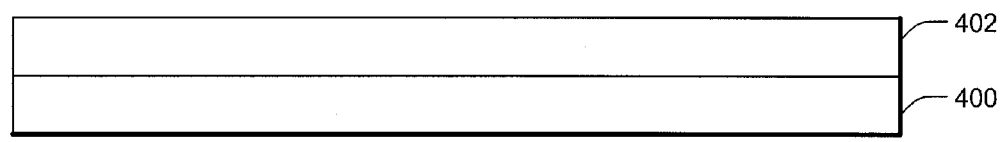
Figure 4C:
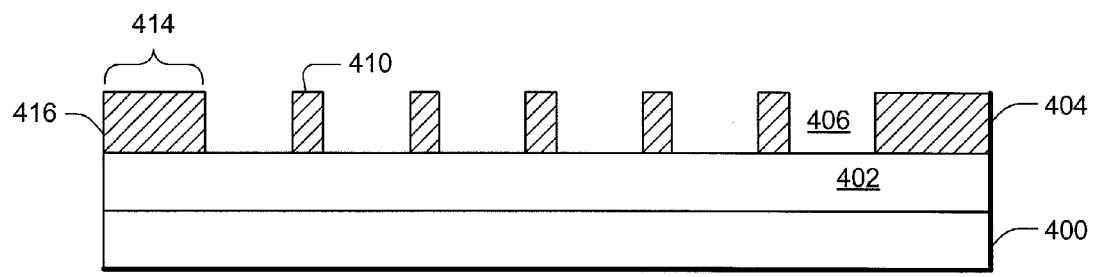

Having described an optical element having periodic gratings with working and non-working area, a manufacturing process in accordance with an exemplary embodiment of the present invention will now be described with reference to FIGS. 4a to 4k. FIG. 4a is a cross sectional view of a layer of substrate material 400, such as a Si wafer. As illustrated in FIG. 4b, a layer of grating material 402, such as TiO2, is formed on a surface of the substrate layer 400. As illustrated in FIG. 4c, a resist layer 404 is formed on a surface of the grating material layer 402. The resist layer 404 includes openings, such as opening 406, extending through the resist layer 404 to expose portions of the surface of the grating material. The openings may define a periodic pattern. The pattern may be formed in the resist layer by several methods including lithography by phase shift mask, interference lithography using multiple laser beams or an imprint process.

In a resist layer in accordance with an exemplary embodiment of the present invention, the openings extend along one surface dimension of the resist layer 404 creating a line hole pattern of spaced apart grooves. Such a line hole pattern is useful for creating periodic gratings and the like.

In a resist layer in accordance with an exemplary embodiment of the present invention, the height of the resist layer is in the range of 400 nm, the openings are in the range of 110 nm wide with a spacing in the range of 140 nm leaving lands or ridges, such as ridge 410, of around 30 nm wide. Furthermore, in one portion 414 of the pattern, one or more ridges or lands 416 are formed having a width of about 400 nm. These dimensions are representative of grating dimensions for a component for a PBS for visible wavelengths. As can be readily understood by those skilled in the art, the pitch depends on the wavelength. For example, in the case of infrared applications, the pitch might be larger than that of the above example in proportion to wavelength.

Figure 4D:
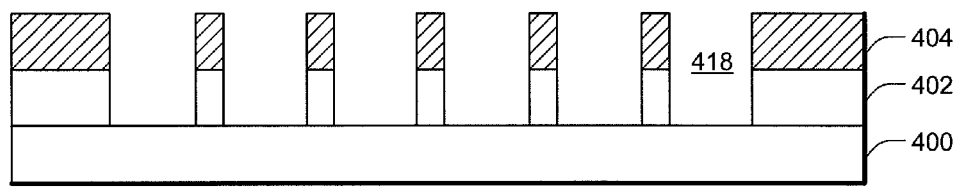

FIG. 4d illustrates forming a pattern in the grating material layer 402. The pattern includes one or more openings, such as opening 418, extending substantially from a surface of the resist layer 404, through grating material layer 402 to substrate layer 400. In a manufacturing process in accordance with one exemplary embodiment of the present invention, the pattern in the grating material layer 402 is formed by a dry etching process such as Reactive Ion Etching (RIE) through the openings 406 in the resist layer 404. In this manufacturing process, the Si layer is prepared as an etch stopping layer to avoid any damage to the Si surface of the substrate layer 400. Accordingly, conventional enchants may be used in Si Large-Scale Integration (LSI) processes to etch by high selectivity such as $CF_4+H_2$, $C_2F_6$, $CHF_3$, and $C_3F_8$.

Figure 4E:
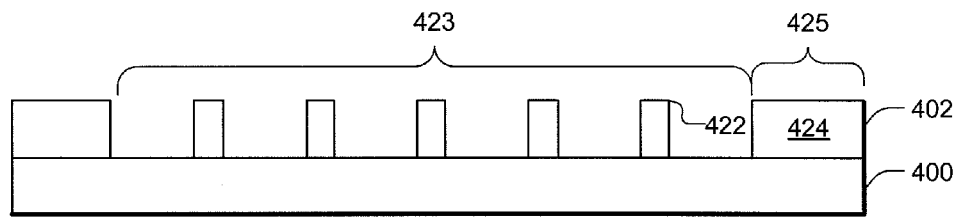

FIG. 4e illustrates a pattern formed in the grating material layer 402 by the etching process and then removing the resist layer leaving behind the patterned grating material layer 402 atop the substrate layer 400. The resulting patterned grating material layer 402 includes one or more elongated elements 422, extending away from the plane of FIG. 4e, that are part of a working area 423 of a periodic grating. Furthermore, the patterned grating material layer includes a non-working portion 425 of the periodic grating that includes one or more elements 424 that function as support structures as previously described.

Figure 4F:
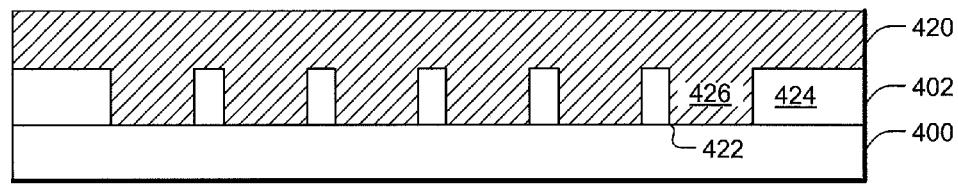
Figure 4G:
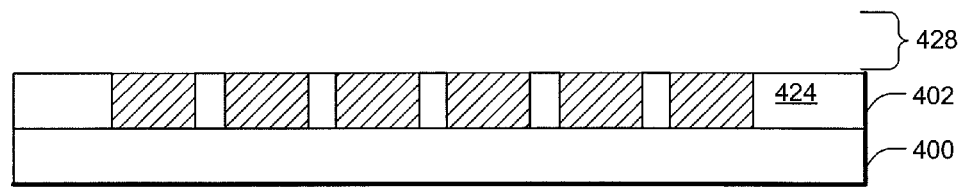

FIG. 4f illustrates depositing a sacrificial layer 420 filing the spaces, such as space 426, in the patterned grating material layer 402. The sacrificial layer may be of a material such as SiO2 deposited by a process such Chemical Vapor Deposition (CVD). FIG. 4g illustrates removing any over-deposition 428 of the sacrificial layer and flattening by a process such as Chemical Mechanical Polishing (CMP). As the grating material layer now includes one or more support structures 424, the support structures may be used as a stopper indicating when the flattening process may be stopped.

Figure 4H:
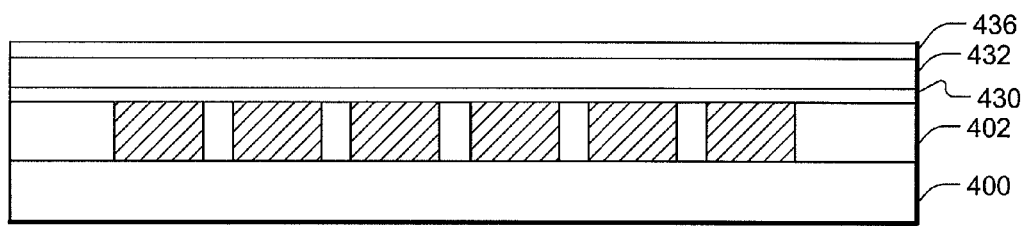

FIG. 4h illustrates adding an additional periodic grating structure. To do so, a thin etch stopper layer 430 is deposited on the layer of patterned grating material 402. Then, an additional layer of grating material 432 is deposited and used to construct an additional periodic grating structure as previously described.

Figure 4I:
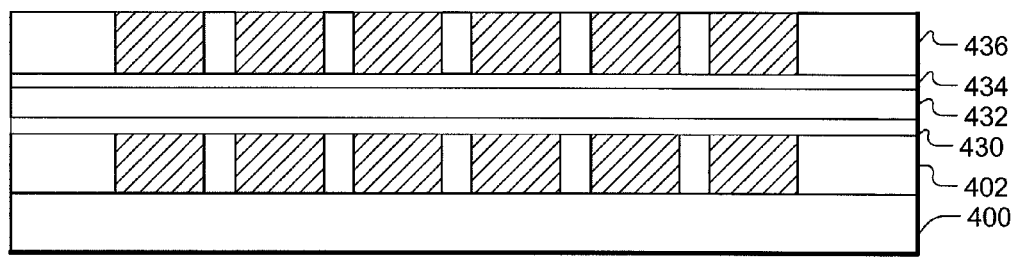

FIG. 4i illustrates continuing to add periodic grating structures by adding additional etch stop layers, such as etch stop layer 434, additional layers of grating material, such as additional grating material layer 436 and then constructing an additional periodic grating structure as previously described. Although only three periodic grating structures are illustrated in FIG. 4i, it is to be understood that any number of periodic grating structures may be stacked or piled up in this manner.

Figure 4J:
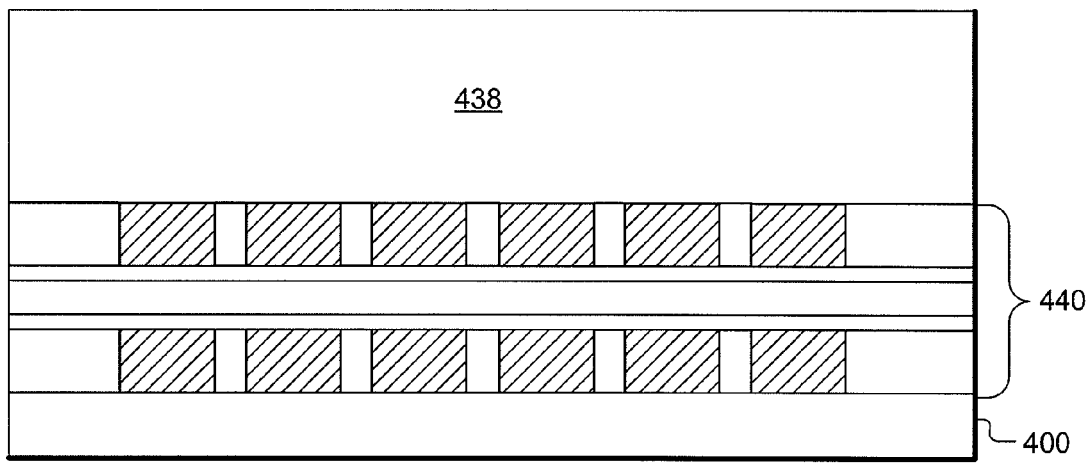
Figure 4K:
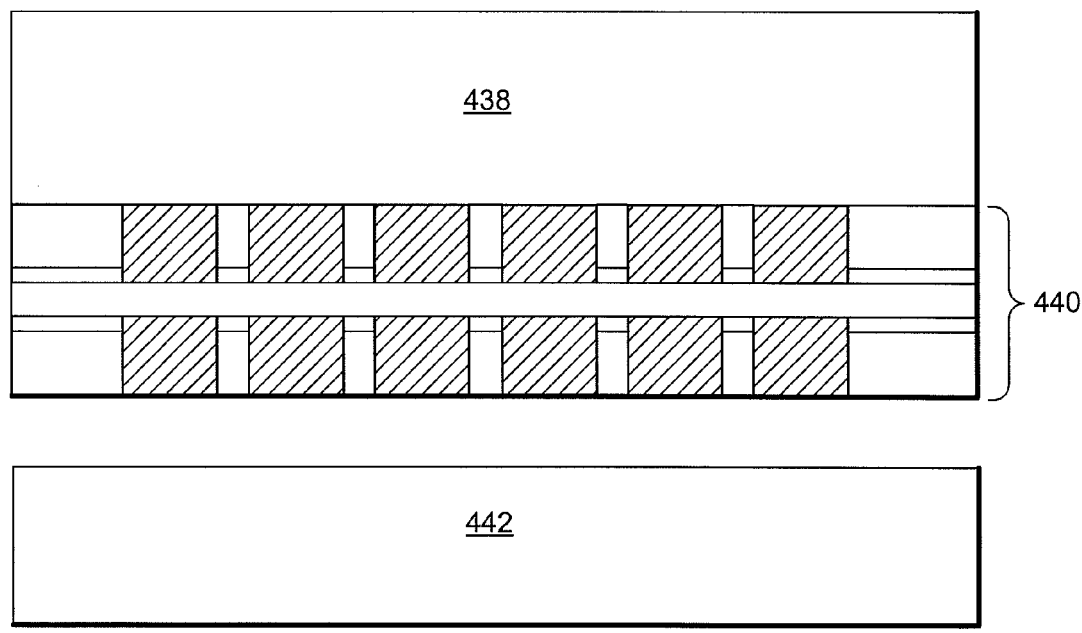

FIG. 4j illustrates bonding an additional component 438 to the stack of periodic grating structures 440 and then removing the sacrificial filler material by a chemical process. FIG. 4k illustrates removing the substrate layer 400 (of FIG. 4j) and bonding an additional component 442 to the stack of periodic grating structures to create a working device.

In one embodiment of the present invention the each stopper layer is of a material such as $Al_2O_3$, and is deposited at a thickness of around 10 nm to 20 nm.

In another embodiment of the present invention, the additional periodic grating structure layer is about 65 nm in thickness.

In another embodiment of the present invention, the additional periodic grating structure has a different orientation than the first periodic grating structure.

Figure 5A:
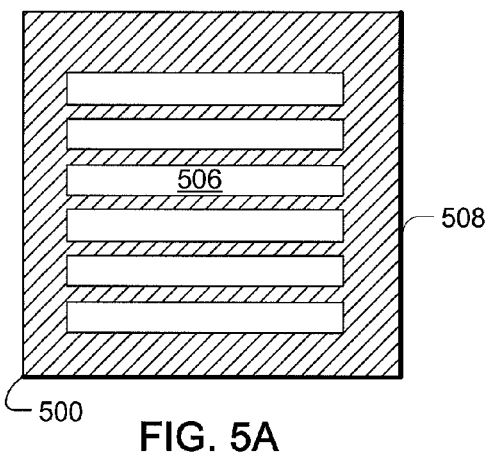
FIGS. 5a, 5b and 5c are top views of periodic grating structures in accordance with an exemplary embodiment of the present invention.
Figure 5B:
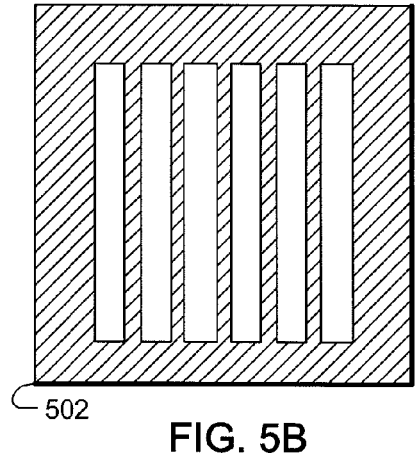
Figure 5C:
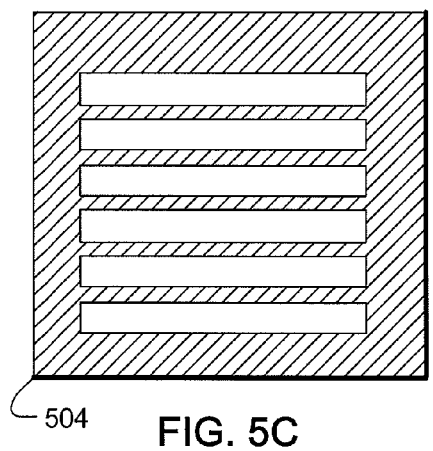

FIGS. 5a, 5b and 5c are top views of a series of periodic grating structures, 500, 502 and 504, each having different orientations, that are stacked on top of each other in accordance with the previously described manufacturing processes. As illustrated in FIG. 5a, each periodic grating structure has a working area 506 and a non-working area 508 peripheral to the working area. The non-working area includes support structures as previously described.

Figure 5D:
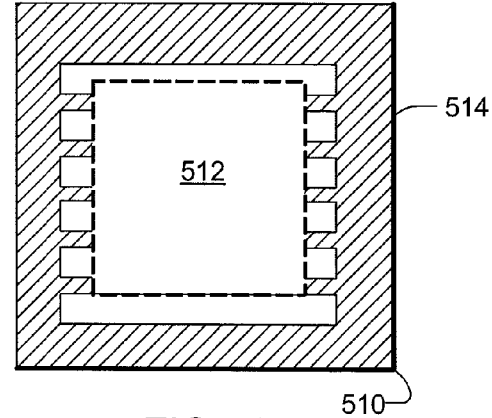
FIG. 5d is a top view of a stack or pile of periodic grating structures in accordance with an exemplary embodiment of the present invention.

FIG. 5d is a top view of the periodic grating structures stacked or piled atop each other. In the stack or pile 510, there is a working area 512 and a non-working area 514 including support structures (not shown) that mate with each other. The resulting stack 510 corresponds to the layered periodic structure 102 shown in cross-section in FIG. 3.

FIGS. 6a, 6b and 6c are top views of a series of periodic grating structures, 600, 602 and 604, each having different orientations, that are stacked on top of each other as in FIGS. 5a, 5b and 5c. The periodic grating structures 600, 602 and 604 include a working area, such as working area 606 in periodic grating structure 600. The periodic grating structure 600 further includes a peripheral non-working area 608 surrounding the working area. The peripheral non-working area includes one or more openings, such as opening 610. These openings allow fluids, such as gases and liquids, to enter the periodic grating structure 600 during processing and manufacturing when the periodic grating structure 600 is stacked with periodic grating structures 602 and 604.

FIG. 6e is a schematic illustrating use of alignment marks in accordance with an exemplary embodiment of the present invention. Each periodic grating structure in a stack 610 may include one or more alignment marks, such as alignment mark 612. During assembly of the stack 610, the alignment marks may be used to align the periodic grating structures.

FIG. 6e is a schematic illustrating alignment marks in accordance with an exemplary embodiment of the present invention. In FIG. 6e, two alignment marks are shown. Alignment mark 613 is superimposed with alignment mark 614. The alignment marks 613 and 614 are on separate periodic grating structures (not shown) that are stacked on top of each other.

In one type of alignment mark in accordance with an exemplary embodiment of the present invention, alignment marks on successive layers of structures have different formats. For example, alignment mark 613 on a first layer is wider than alignment mark 614 on a successive layer. This configuration allows aligning layers of structures by placing one alignment mark within or over another.

In another type of alignment mark in accordance with an exemplary embodiment of the present invention, the alignment marks include Vernier scales 616 and 618. The Vernier scales can be used to more accurately align the periodic grating structures during assembly.

Figure 7:
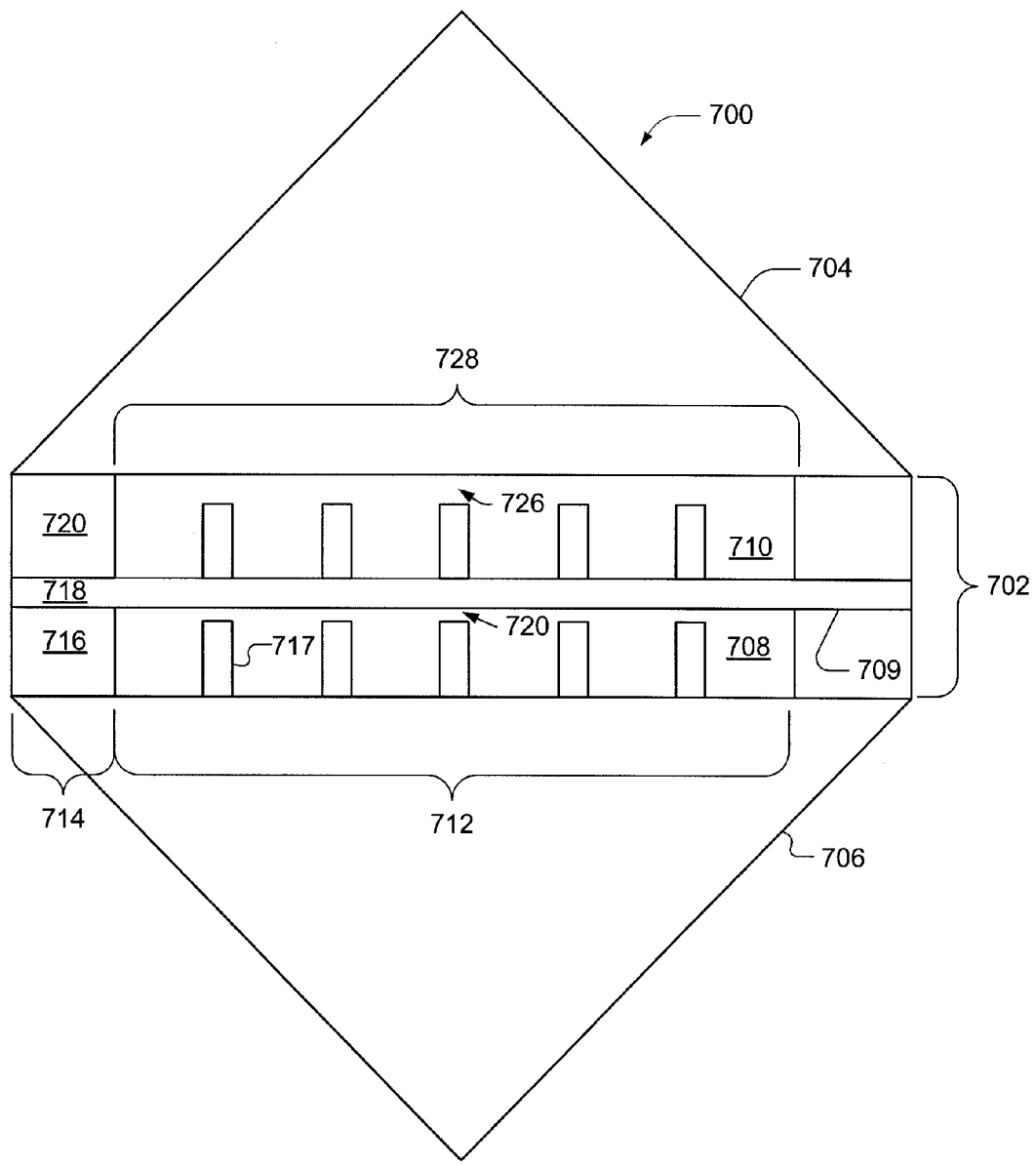
FIG. 7 is a cross-sectional schematic view of another optical device in accordance with an exemplary embodiment of the present invention.

FIG. 7 is a cross-sectional schematic view of another optical device in accordance with an exemplary embodiment of the present invention. A polarization splitting element 700 includes a layered periodic structure 702 bonded to a first component, such as prism 704, and a second component, such as prism 706. The layered periodic structure includes a plurality of periodic grating structures, such as periodic grating structures 708, 709 and 710. Each periodic grating structure includes at least one working area, for example working area 712 of periodic grating structure 708, and at least one non-working area, such as non-working area 714 of periodic grating structure 708. The non-working area includes one or more support structures that include elements, such as element 716, that take the loads applied to the periodic grating structures. The working area 712 of the periodic grating structure 708 includes elements, such as element 717 that are shorter in height than the element's corresponding support structure 716. This ensures that any loads applied to the periodic grating structures are carried by the mating support structure elements 716, 718 and 720 in the non-working areas of the periodic grating structures and not the elements in the working areas of the periodic grating structures. This is because there is a gap, such as gap 720, between the elements of the working area of the periodic grating structure 708 and the adjacent periodic gratings structure's 709 working area 724. Furthermore, there will be a gap, such as gap 726, between elements in a working area 728 of the periodic grating structure 710 and prism 704.

Figure 8A:
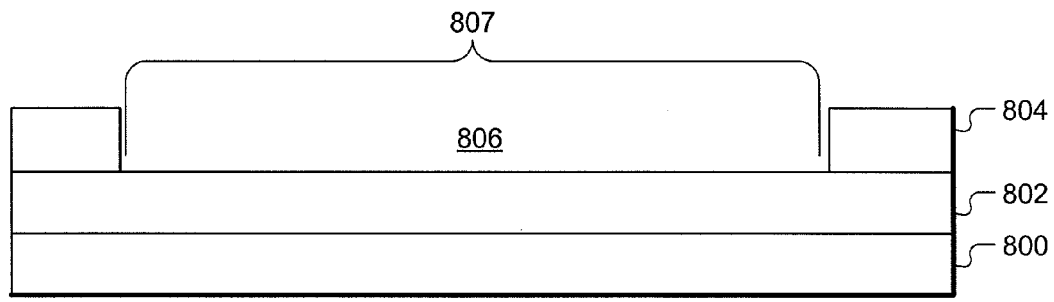
FIGS. 8a, 8b and 8c are schematics illustrating a manufacturing process for a layered structure in accordance with an exemplary embodiment of the present invention.
Figure 8B:
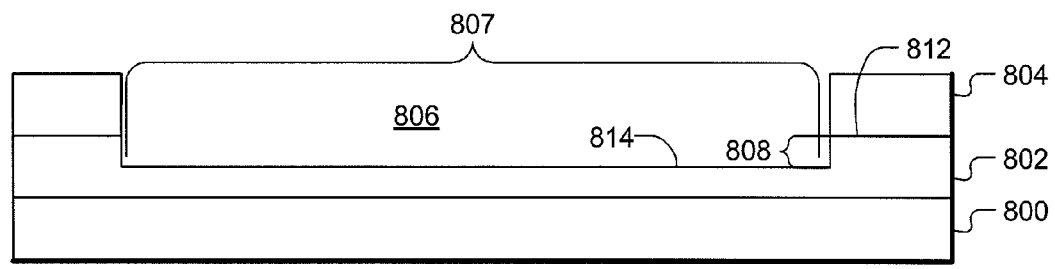
Figure 8C:
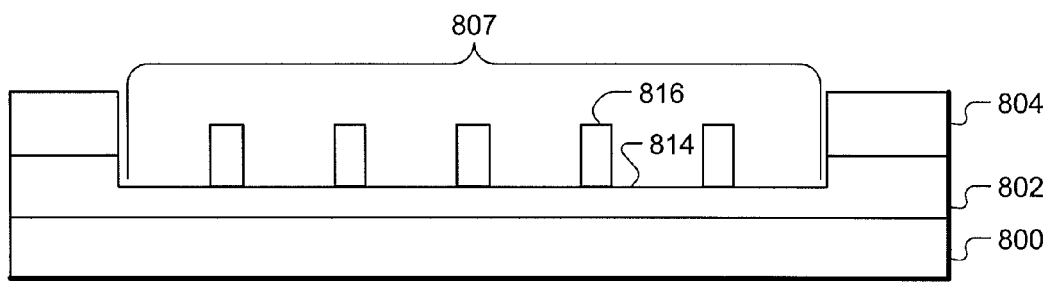

FIGS. 8a, 8b and 8c are schematics illustrating a manufacturing process for a layered structure having support structures that have heights greater than the height of elements in a working area of the layered structures. FIG. 8a is a cross sectional view of a layer of substrate material 800, a layer of grating material 802, formed on a surface of the substrate layer 800, and a first resist layer 804 formed on a surface of the grating material layer 802. The resist layer 804 includes an opening 806 extending through the resist layer 804 to expose a portion 807 of the surface of the grating material layer. The opening may be formed in the resist layer by several methods including lithography by phase shift mask, interference lithography using multiple laser beams or an imprint process.

FIG. 8b illustrates etching the grating material layer 802 in order to develop a height difference 808 between a surface 810 of the resist material protected portion 812 of the grating material layer 802 and a surface 814 of the exposed portion 807 of the grating material layer 802. During the manufacturing of the structured layer, the exposed portion 807 will be used to create elements in a working area of a periodic grating structure while the protected portion 812 of the grating material layer 802 will be used to create an elevated support structure.

FIG. 8c illustrates forming a second resist layer pattern 816 on the lower surface 814 of the exposed portion of the grating material layer 802. The remaining manufacturing process for a stack or pile of periodic grating structures is then similar to the manufacturing process illustrated in FIGS. 4d to 4k.

Figure 9A:
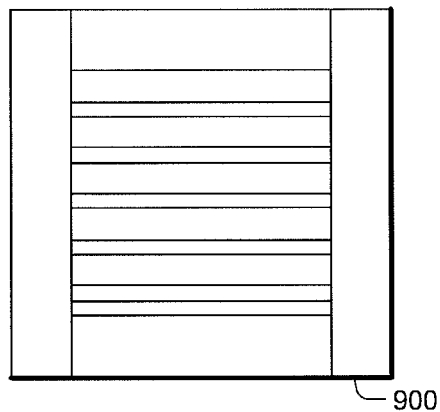
FIGS. 9a, 9b and 9c are top views of periodic grating structures in accordance with an exemplary embodiment of the present invention.
Figure 9B:
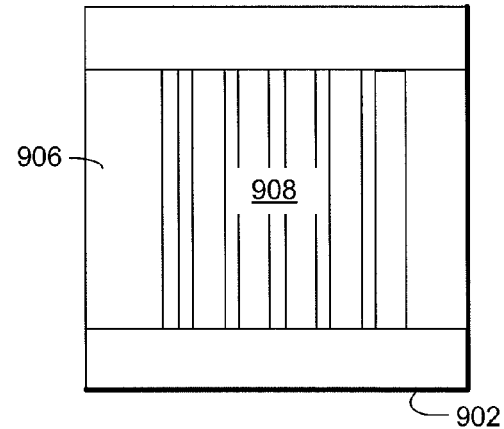
Figure 9C:
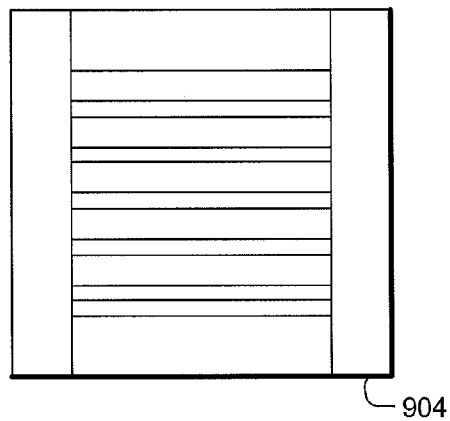

FIGS. 9a, 9b and 9c are top views of a series of periodic grating structures in accordance with an exemplary embodiment of the present invention. Each periodic grating structure, 900, 902 and 904, includes a working area, such as working area 906, and a non-working area, such as non-working area 908. Each non-working area includes one or more elements that have a higher height relative to a height of elements in the working area as described in FIG. 8c.

Figure 9D:
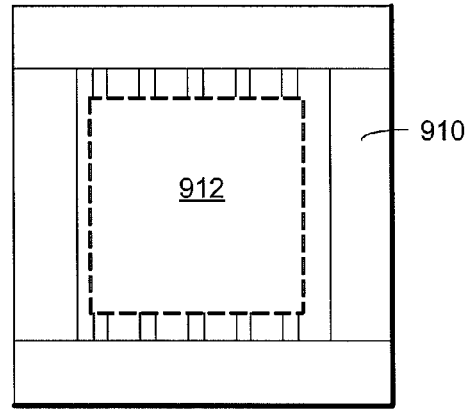
FIG. 9d is a top view of a stack or pile of periodic grating structures in accordance with an exemplary embodiment of the present invention.

FIG. 9d illustrates a top view of stacking or piling the periodic grating structures 900, 902 and 904 of FIGS. 9a, 9b and 9c respectively, on top of each other. Once stacked, the non-working areas 910 of the periodic grating structures overlay one another. In addition, the working areas 912 of the periodic grating structures also overlay each other. This allows the support structures within the non-working areas to contact each other and transmit loads to each other without affecting the non-contacting working areas of the periodic grating structures.

Referring now to FIGS. 10a, 10b and 10c, FIG. 10a is a top view of a periodic grating structure in accordance with an exemplary embodiment of the present invention, FIG. 10b is a cross-sectional view along line AA of FIG. 10a and FIG. 10b is a cross-sectional view along line BB of FIG. 10a. The periodic grating structure 1000 includes a non-working area 1002 having one or more support structure elements 1004 that have a height that exceeds a height of any element, such as element 1006, in a working area 1008 of the periodic grating structure. Furthermore, the height of the support structure elements also exceeds a height of other portions 1010 of the non-working area.

Referring now to FIGS. 10a, 10d and 10e, top views of a series of periodic grating structures 1000, 1012 and 1014, are shown. Each periodic grating structure 1000, 1012 and 1014 includes a non-working area 1002, 1016 and 1018, respectively. In addition, each non-working area, 1002, 1016 and 1018 includes one or more support structure elements 1004, 1020 and 1022, respectively. Each support structure element 1004, 1020 and 1022 has a height that is greater than a height of their respective working areas 1008, 1024 and 1026. This allows the periodic grating structures 1000, 1012 and 1014 to be stacked or piled on top of each other with each periodic grating structure being supported in the stack or pile by the support structures in the non-working areas of the periodic grating structures without affecting the working areas. Furthermore, each support structure element 1004, 1020 and 1022 has a height that is greater than a height of a portion, 1010, 1028 and 1030 respectively, of each support elements' respective non-working areas. This ensures that openings exist between support structures in a particular layer in a stack or pile such that fluids may reach the interior working areas of the stack or pile.

Figure 11:
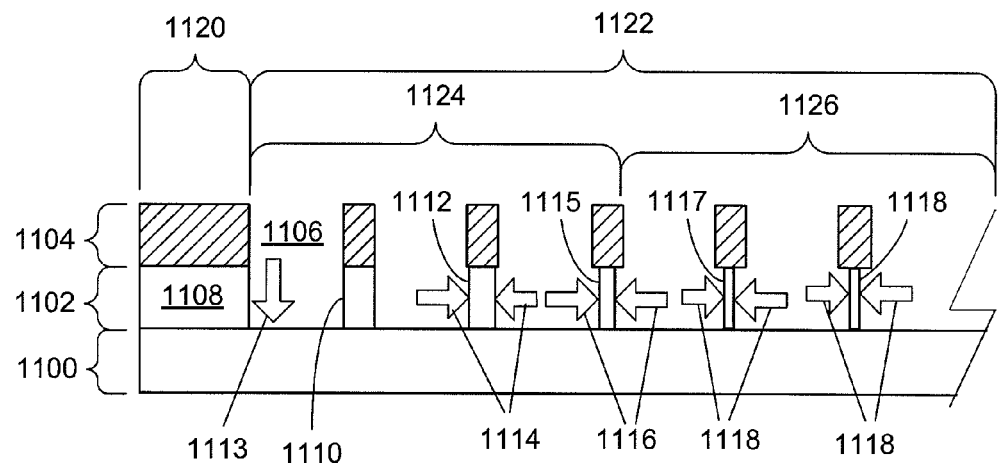
FIG. 11 is a partial cross-sectional view of a transitional area of a periodic grating structure in accordance with an exemplary embodiment of the present invention.

FIG. 11 is a partial cross-sectional view of a transitional area of a periodic grating structure during manufacturing in accordance with an exemplary embodiment of the present invention. As previously described, during the manufacture of a periodic layered structure, a layer of substrate material 1100 is overlain with a layer of grating material 110. A resist layer 1104 is formed on a surface of the grating material layer 1102. The resist layer 1104 includes openings, such as opening 1106, extending through the resist layer 1104 to expose portions of the surface of the grating material. The openings may define a periodic pattern.

As previously described, a pattern is formed by etching portions of the grating layer 1102 exposed by the openings in the resist layer 1104. During the etching process, the pattern is formed such that peripheral support structures in a non-working area of a grating, such as support structure 1108, are formed around a series of grating elements, such as grating elements 1110 and 1112. During the etching process, the grating material is etched downward (1113) towards the substrate layer 1100. In addition, the etching process also etches horizontally (1114, 1116 and 1118) into the grating elements.

Furthermore, the etching rate is different for those grating elements closer to the support structure, such as elements 1110 and 1112, than for those grating elements further away from the support structure, such as elements 1115, 1117 and 1119, because of a process known as microloading. This results in the grating elements having progressively different sizes depending on how close a grating element is to the support structure. However, after a finite number of grating elements, the grating elements attain a relatively uniform size as the microloading effect is diminished. For example, grating elements 1117 and 1119 are shown has having a relatively uniform size as the rate of horizontal etching (1118) is approximately the same for both grating elements. Therefore, as a result of the microloading effect, a periodic structure may end up having a non-working area 1120 and a working area 1122 wherein the working area includes a transitional area 1124 and an effective working area 1126. In the transitional area 1124, the grating elements 1110, 1112 and 1115 have differing widths because of microloading effects. However, in the effective working area 1126, the grating elements, such as grating elements 1117 and 1119, the widths of the elements are relatively uniform.

Figure 12:
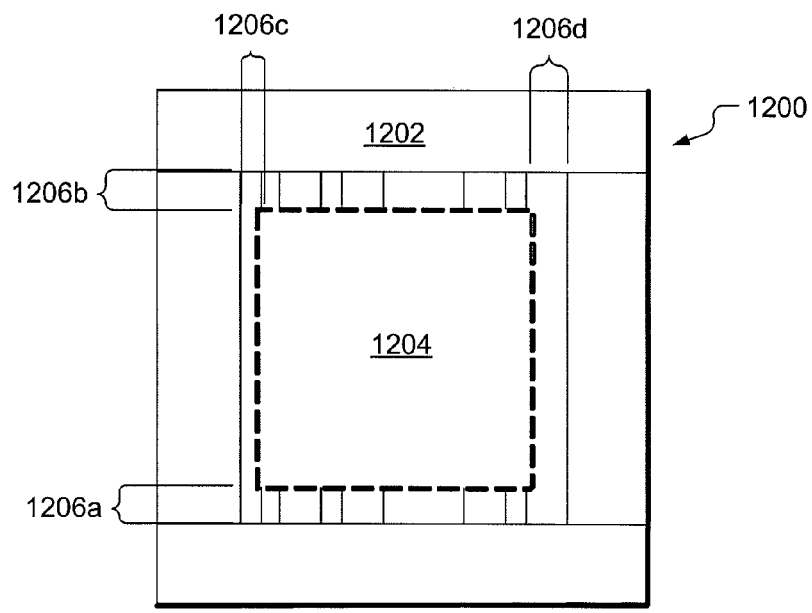
FIG. 12 is a top view of a transitional area of a layered periodic structure in accordance with an exemplary embodiment of the present invention.

FIG. 12 is a top view of a transitional area and an effective area of layered periodic structure in accordance with an exemplary embodiment of the present invention. In the top view, a stack or pile of periodic grating structures (not shown), each having their own transitional and effective areas are used to create a layered periodic structure 1200 as previously described. The resultant layered periodic structure 1200 has a peripheral non-working area 1202. Furthermore, as each periodic grating structure includes both a transitional area and an effective area, an interior portion of the layered periodic structure also includes a transitional area, as indicated by 1206a, 1206b, 1206c and 1206d surrounding an effective area 1204.

Figure 13:
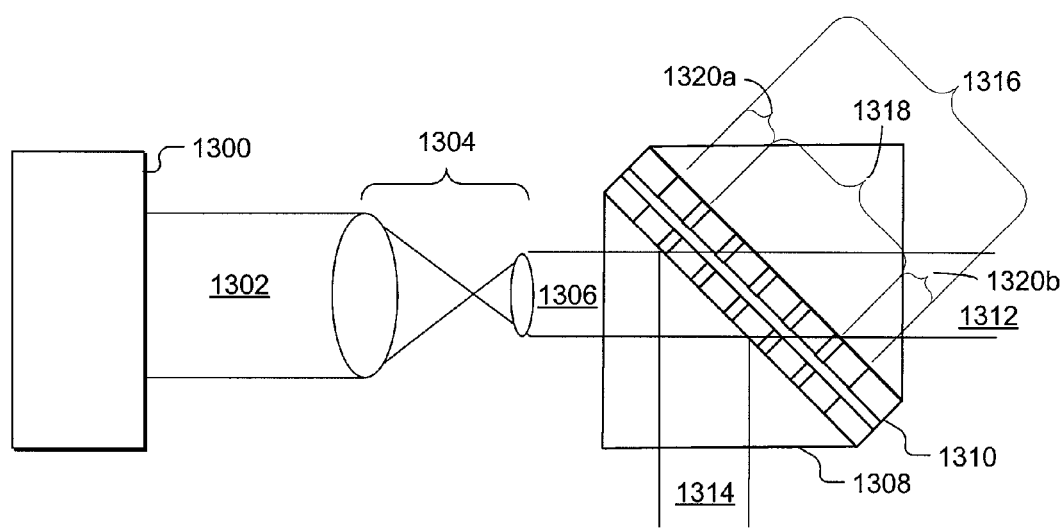
FIG. 13 is a cross-sectional view of a transitional area and an effective area of a layered periodic structure as utilized in an optical application in accordance with an exemplary embodiment of the present invention.

FIG. 13 is a cross-sectional view of a transitional area and an effective area of a layered periodic structure as utilized in an optical application in accordance with an exemplary embodiment of the present invention. A light source 1300 projects a beam of light 1302 through a focusing device 1304. The focusing device creates a second beam of light 1306 that is transmitted into a layered periodic structure 1310 including a plurality of periodic grating structures (not shown) in an optical device 1308. Each of the periodic grating structures has an effective area and a transitional area (not shown). Therefore, and as previously described, when the layered periodic structure 1310 is built using the periodic grating structures, the layered periodic structure 1310 will also have a working area 1316 including an effective area 1318 and a transitional area, as indicated by 1320a and 1320b. In operation, the layered periodic structure 1310 splits the second beam of light 1306 into a first polarized beam of light 1312 and a second polarized beam of light 1314. The light source and focusing device are configured such that they transmit the second beam of light 1306 into the effective area 1318 of the working area 1316 of the layered periodic structure 1310 without transmitting light into the transitional area, as indicated by 1320a and 1320b, of the working area 1316.

The present invention has been described above with respect to particular illustrative embodiments. It is understood that the present invention is not limited to the above-described embodiments and that various changes and modifications may be made by those skilled in the relevant art without departing from the spirit and scope of the invention.

What is claimed is:

1. A grating in an optical device, comprising:
a working area comprising a first periodic grating structure located in a first layer and a second periodic grating structure located in a second layer adjacent to the first layer; and
a non-working area comprising a first support structure located in the first layer and a second support structure located in the second layer.
wherein the first periodic grating structure and the second periodic grating structure are different from each other,
wherein the first support structure mates with the second support structure, and
wherein the first support structure mates with an additional component of the optical device.

2. The grating of claim 1, wherein a ratio of a width of an element of the support structure to a height of the element of the support structure is greater than a ratio of a width of an element in the periodic grating structure to a height of the element in the periodic grating structure.

3. The grating of claim 1, wherein
a ratio of a width of an element of the support structure to a height of the element of the support structure is greater than a ratio of a width of an element in the periodic grating structure to a height of the element in the periodic grating structure; and
the height of the element of the support structure is greater than the height of the element in the periodic grating structure.

4. The grating of claim 1, wherein the additional component is another grating in the optical device.

5. The grating of claim 1, wherein the additional component is an optical component.

6. The grating of claim 1, wherein the non-working area further comprises an alignment mark.

7. The grating of claim 6, wherein the alignment mark is located on a surface of the support structure.

8. The grating of claim 1, wherein the non-working area is peripheral to the working area.

9. The grating of claim 8, wherein the non-working area and support structure are contiguous and enclose the working area.

10. The grating of claim 9, wherein the support structure includes an opening into the enclosed working area.

11. The grating of claim 8, wherein the support structure is non-contiguous providing one or more openings in communication with the working area.

12. The grating of claim 1, wherein the support structure comprises a plurality of non-contiguous support elements.

13. The grating of claim 1, wherein the working area further comprises an effective area of the periodic grating structure and a transitional area of the periodic grating structure, the transitional area located between the effective area and the non-working area.

14. A system for generating polarized light, comprising:
an optical device comprising:
a layered periodic grating structure, comprising:
   a working area comprising a first periodic grating structure located in a first layer and a second periodic grating structure located in a second layer adjacent to the first layer; and
   a non-working area comprising a first support structure located in the first layer and a second support structure located in the second layer,
   wherein the first periodic grating structure and the second periodic grating structure are different from each other,
   wherein the first support structure mates with the second support structure, and
   wherein the first support structure mates with an additional component of the optical device; and a light source configured to transmit light into the effective area of the layered periodic grating structure without transmitting light into the non-working area of the layered periodic grating structure.

15. The grating according to claim 1, wherein
the first periodic grating structure and the first support structure are formed in a first step, and
the second periodic grating structure and the second support structure are formed in a second step different from the first step.

16. An optical device comprising:
a grating; and
a prism,
wherein the grating comprises a working area comprising a first periodic grating structure located in a first layer and a second periodic grating structure located in a second layer adjacent to the first layer and a non-working area comprising a first support structure located in the first layer and a second support structure located in the second layer,
wherein the first periodic grating structure and the second periodic grating structure are different from each other,
wherein the first support structure mates with the second support structure, and
wherein the first support structure mates with the prism.

* * * * *